(12) United States Patent
Basu et al.

(10) Patent No.: US 11,265,343 B2
(45) Date of Patent: Mar. 1, 2022

(54) SYSTEM AND METHOD FOR CYBER TRAINING

(71) Applicant: HAIKU, INC., San Diego, CA (US)

(72) Inventors: Eric Basu, Henderson, NV (US); Francis Kong, Alameda, CA (US); Edmond Avanesian, San Diego, CA (US); Rodney Riley, Jr., San Diego, CA (US); Blair Van Ferguson, Jr., Spring Valley, CA (US)

(73) Assignee: HAIKU, INC., San Diego, CA (US)

( * ) Notice: Subject to any disclaimer, the term of this patent is extended or adjusted under 35 U.S.C. 154(b) by 0 days.

(21) Appl. No.: 17/013,215

(22) Filed: Sep. 4, 2020

(65) Prior Publication Data
US 2021/0067541 A1 Mar. 4, 2021

Related U.S. Application Data

(60) Provisional application No. 62/895,892, filed on Sep. 4, 2019.

(51) Int. Cl.
| | |
|---|---|
| *H04L 29/06* | (2006.01) |
| *G06F 3/0486* | (2013.01) |
| *H04L 12/26* | (2006.01) |
| *H04L 12/24* | (2006.01) |
| *H04L 43/50* | (2022.01) |
| *H04L 41/22* | (2022.01) |
| *H04L 41/14* | (2022.01) |

(52) U.S. Cl.
CPC ........ *H04L 63/1433* (2013.01); *G06F 3/0486* (2013.01); *H04L 41/145* (2013.01); *H04L 41/22* (2013.01); *H04L 43/50* (2013.01)

(58) Field of Classification Search
CPC ....... G06F 3/0486; H04L 41/22; H04L 43/50; H04L 63/1433
See application file for complete search history.

(56) References Cited

U.S. PATENT DOCUMENTS

2015/0280996 A1\* 10/2015 Berube .............. H04L 41/0853 709/224

OTHER PUBLICATIONS

Ahrenholz, Jeff et al. "CORE: A real-time network emulator." MILCOM 2008—2008 IEEE Military Communications Conference: 1-7. (Year: 2008).\*

Entezari-Maleki, Reza et al. "Performance and power modeling and evaluation of virtualized servers in IaaS clouds." Inf. Sci. 394: 106-122. (Year: 2017).\*

Eskridge, T. et al. "VINE: A Cyber Emulation Environment for MTD Experimentation." Proceedings of the Second ACM Workshop on Moving Target Defense. 43-47. (Year: 2015).\*

Ghosh, Rahul et al. "Quantifying Resiliency of IaaS Cloud." 2010 29th IEEE Symposium on Reliable Distributed Systems: 343-347. (Year: 2010).\*

(Continued)

*Primary Examiner* — John M Macilwinen
(74) *Attorney, Agent, or Firm* — Orrick, Herrington & Sutcliffe LLP

(57) ABSTRACT

A system and method for facilitating various forms of cyber training. In some embodiments, the system and method enable the creation and deployment of cyber ranges. Such a cyber range can simulate one or more network environment(s) of one or more real or hypothetical organizations for various network, software, and system/hardware components, as well as simulations of various network traffic.

9 Claims, 13 Drawing Sheets

(56) References Cited

OTHER PUBLICATIONS

Ferguson, Bernard et al. "National Cyber Range Overview." 2014 IEEE Military Communications Conference: 123-128. (Year: 2014).*
Khojasteh, H. et al. "Task admission control for cloud server pools." 2015 IEEE Wireless Communications and Networking Conference (WCNC): 2115-2119. (Year: 2015).*

* cited by examiner

SYSTEM AND METHOD FOR CYBER TRAINING

CROSS-REFERENCE TO RELATED APPLICATIONS

This application claims priority to U.S. Provisional Patent Application Ser. No. 62/895,892, filed on Sep. 4, 2019, the contents of which are incorporated herein by reference in their entirety and for all purposes.

FIELD

The present disclosure relates generally to computer-implemented training systems and methods and, more particularly, to systems and methods for training on a cyber range.

BACKGROUND

Cyber-attacks and cyber threats include data breaches, individual identification threats, system outages due to hackers, and/or vulnerabilities detected to critical system infrastructures. The number of cyber-attacks is increasing at a staggering rate. For example, the global cost of data breaches is currently estimated at over $2.1 trillion with a cyber-attack occurring almost every thirty-nine seconds. Over three hundred thousand pieces of malware are created daily; over four hundred forty-four thousand ransomware attacks were approximated in 2018. Some estimates suggest that hackers can infiltrate a secured network in just about nineteen minutes.

As these cyber-attacks continue to increase, the need for security systems and trained cyber security experts to protect these information systems is growing just as fast. In fact, the rapidly growing cyber security threat is increasing the demand for personnel with experience to safeguard sensitive systems in both public and private sectors. About 3.5 million cyber security jobs are currently projected to be unfilled. However, properly training the personnel to fulfill these roles is currently lacking.

Current training methods are inadequate to provide the necessary teaching to safeguard critical systems. For example, conventional training methods include developing cyber ranges, which are interactive, simulated representations of a network, system, tool, and application that is connected to a simulated Internet level environment. However, these conventional cyber range development tools are fairly static and cannot easily replicate a wide range of network infrastructures found in various industries. Therefore, conventional training methods cannot transition between multiple environments and functions for rapid deployment and integration with various applications. Often, the static nature of these conventional tools is caused by the lack of proper resource allocation (e.g., server allocation) for use with various simulations. Instead, these tools are typically designed for a single target and a single industry and are often quickly outdated with new cyber threats.

As a further disadvantage, conventional systems and range building tools do not typically attract the average user by providing an approachable system. Although some efforts have been made to encourage friendly competition while training to approach cyber-attacks, games of this nature are physical in form, thereby limiting the accessibility to the average user and restricting the integration with dynamic scenarios.

Accordingly, there is a need for systems and methods for improved cyber security training and cyber range development in an effort to overcome the aforementioned obstacles and deficiencies of conventional cyber-attack training systems.

Figure 1:
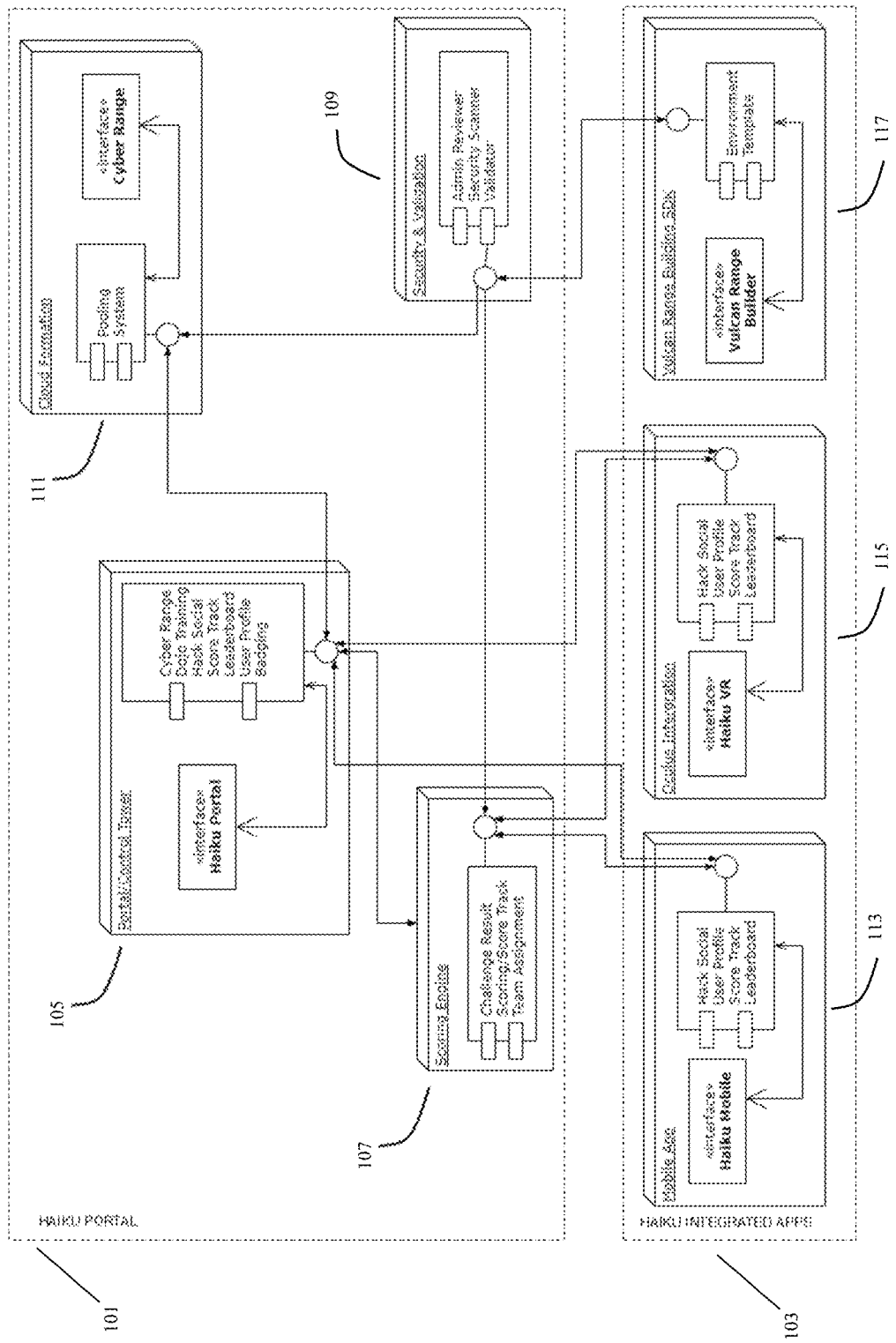
FIG. 1 is a top-level system diagram that illustrates an exemplary general architecture view of the system, according to various embodiments.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

According to various embodiments, systems and methods are disclosed for facilitating various forms of cyber training. Such systems and methods can include ones in which cyber ranges can be created and deployed. Such a cyber range can, as just one example, be a simulation of the network environment(s) of one or more real or hypothetical organizations. The simulation can include various detail, such as simulations of various network, software, and system/hardware components, as well as simulations of various network traffic. The simulations can include both benign and nefarious ones (e.g., malware and/or malicious network traffic can be simulated). In this way, both cyber defense and white hat cyber-attack skills can be honed in a safe environment, in either or both of guided and free play ways. Various aspects will now be discussed in greater detail.

General Architecture/Operation

Turning to FIG. 1, a general architecture view of the system is shown, including portal module group 101 and integrated applications (apps) module group 103. As depicted, the portal module group 101 can include a portal/control tower module 105, a pooling/cloud formation module 111, a scoring engine module 107, and a security and validation module 109. As also depicted, the integrated apps module group 103 can include a mobile app module group 113, an immersive computing (e.g., a virtual/augmented reality system such as Oculus) integration module 115, and a range building software development kit (SDK) module 117.

As illustrated by FIG. 1, the portal/control tower module 105 can provide capabilities including a cyber range, dojo training, a hack social, a score track, a leaderboard, one or more user profiles, and badging. As also illustrated by FIG. 1, the scoring engine module 107 can provide capabilities including challenge result, scoring/score track, and team assignment. As additionally illustrated by FIG. 1, the pooling/cloud formation module 111 can provide capabilities including pooling system capabilities. Moreover, the security and validation module 109 can provide capabilities including administrator (admin) review, security scanning, and validation. The mobile app module 113 and the immersive computing integration module 115 can each provide capabilities including a hack social, user profiles, score track, and leaderboard. Further still, the range building SDK module 117 can provide capabilities including environment template capacities. Hereinbelow, additional discussion of various of the modules of FIG. 1 is provided.

Figure 2:
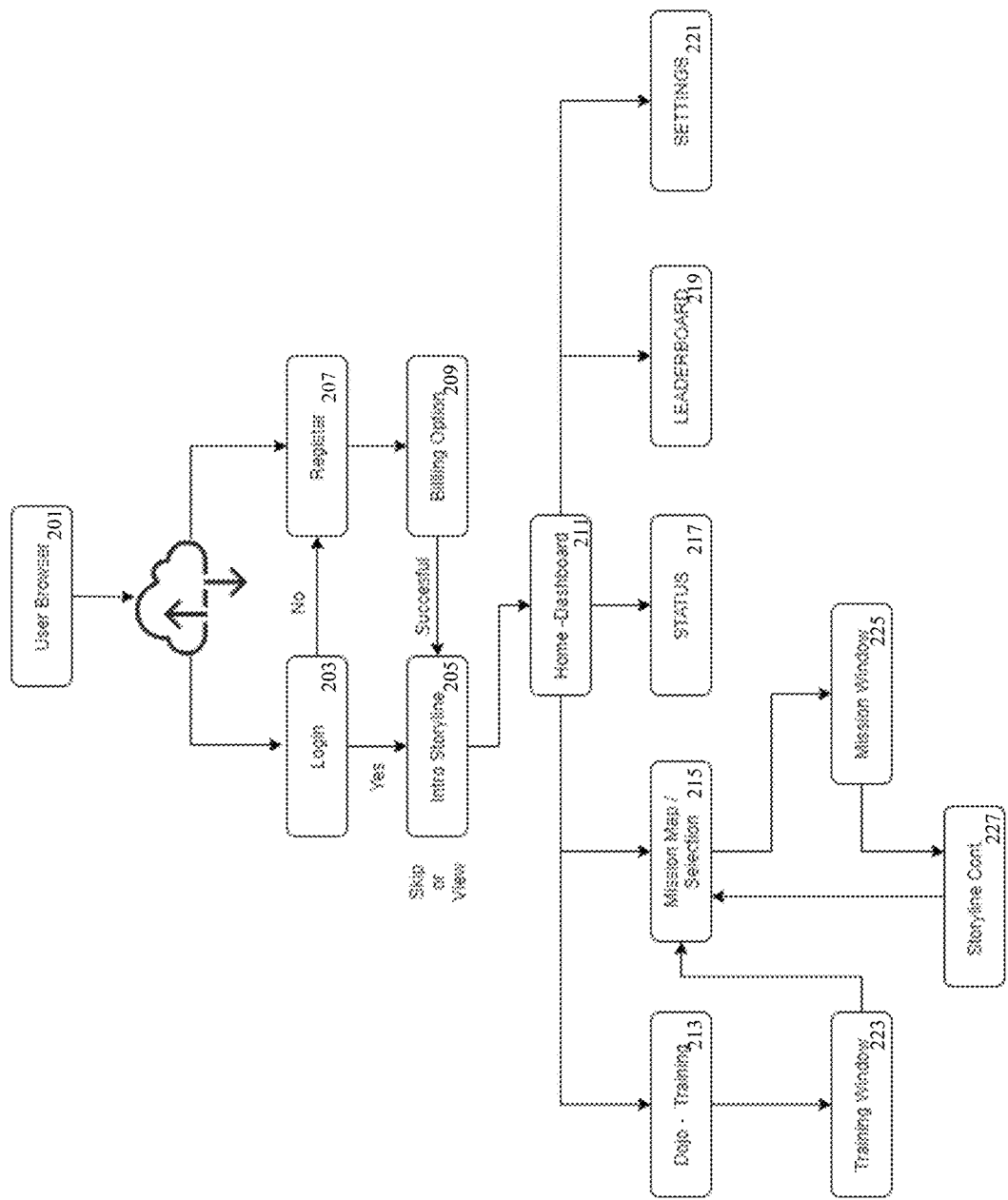
FIG. 2 is a flowchart showing exemplary data flow for interaction with the system by a user, according to various embodiments.

Turning to FIG. 2, shown is a flowchart regarding interaction with the system by a user. At step 201, the user can access the system via a web browser, app, or other modality. The system can be implemented in a cloud-based manner. If the user is an existing user, the user can log in at step 203, and then opt to either view or skip a storyline introduction at step 205. The storyline introduction can provide a scenario for the cyber training that the user is to experience (e.g., that an attack on the computer infrastructure of a particular power grid is expected.). If the user is not an existing user, the user can register at step 207, provide billing information at step 209 (in some embodiments), and then proceed to discussed step 205.

After viewing or skipping the storyline intro at step 205, the user can proceed to the home dashboard at step 211. From here, the user can select various destinations including dojo training 213, mission map selection 215, status information 217, leaderboard viewing 219, and settings selection 221. As depicted by FIG. 2, from the dojo training of step 213 the user can proceed to training window 223. As shown by FIG. 2, from training window 223 the user can proceed to noted mission map selection 215.

Also referring to FIG. 2, from mission map selection 215 the use can proceed to mission window 225, onward to a storyline continuation at step 227, and then can return to mission map selection 215.

Portal/Control Tower, Scoring Engine, and Security and Validation Modules

With reference to FIG. 1, the portal/control tower module 105 allows users to transition between multiple environments and functions seamlessly and without interruptions. In some embodiments, the portal/control tower module 105 supports and coordinates one or more modules including modules 107-115, thereby enabling fast load times, rapid deployment, minimized user wait time, and integration with multiple apps. As mentioned, the portal/control tower module 105 can also provide capabilities including cyber range, dojo training, hack social, score track, leaderboard, user profile, and badging.

The scoring engine module 107 enables seamless integration with third-party cybersecurity capture-the-flag (CTF) software modules, templates and/or scripts to provide quick and easy access and interchangeable integration with portal/control tower module 105. As mentioned, the scoring engine module 107 can provide also capabilities including challenge result, scoring/score track, and team assignment. Returning to the security and validation module 109, this module provides functionality including validating and reassuring security for submitted environmental templates from the range building SDK module 117. The security and validation module 109, in an aspect, sets a pre-approved process before administrators of the system give (e.g., via a UI provided by the system) final sign-off of templates submitted by third-party (or other) range builder developers.

Pooling/Cloud Formation Module

Figure 3:
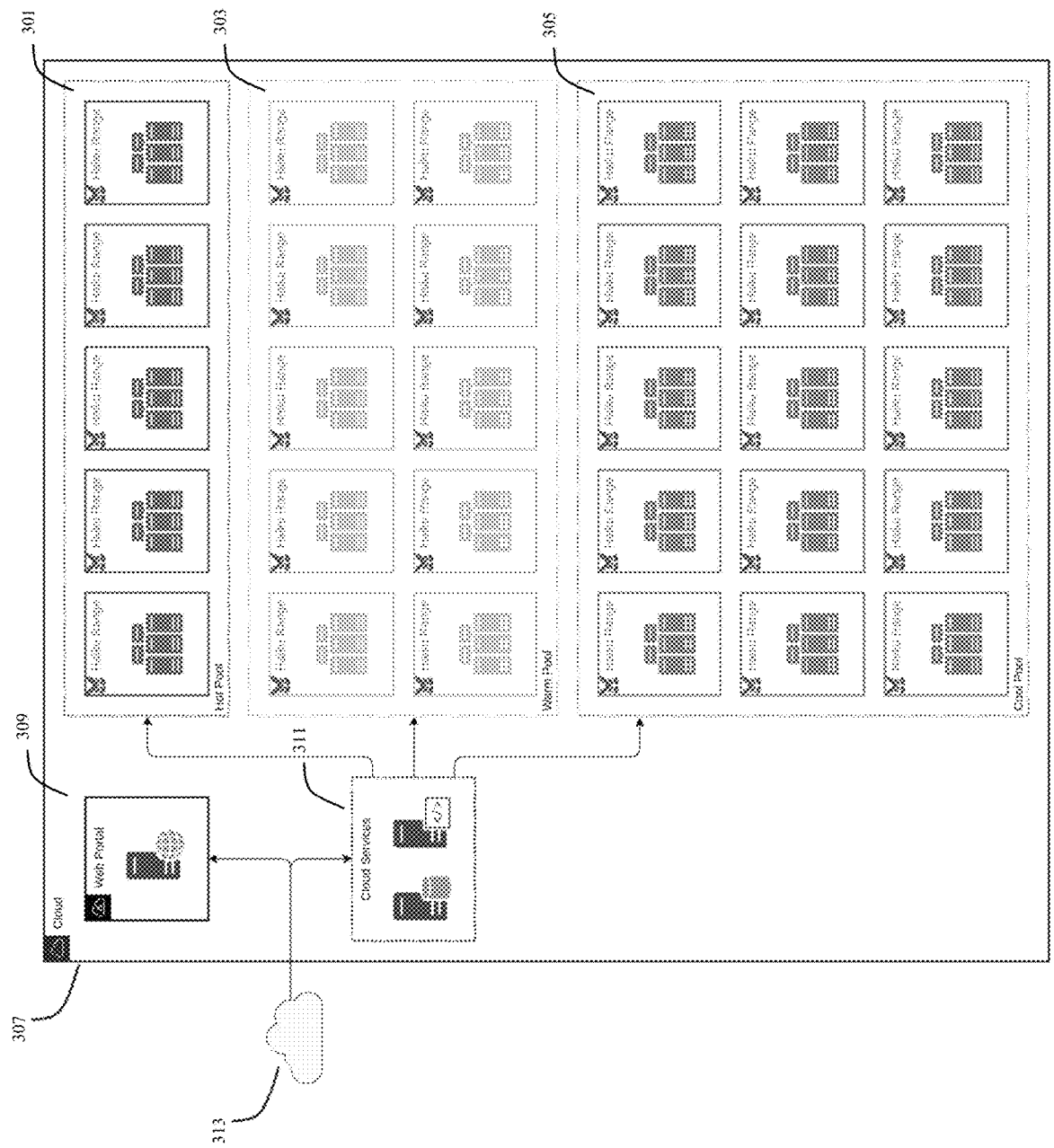
FIG. 3 is a top-level diagram that illustrates exemplary pool functionality, according to various embodiments.

With further regard to pooling/cloud formation module 111, this module provides for functionality including speeding up the end-user experience of accessing a given cyber range. Turning to FIG. 3, shown is a diagram depicting pool functionality facilitated by the pooling/cloud formation module 111. The pooling/cloud formation module 111 can allocate one or more pools, such a hot pool 301, a warm pool 303, and a cool pool 305. As shown in FIG. 3, the pools 301-305 are deployed within a cloud 307, and in connection with a cloud-deployed web portal 309 and one or more cloud-deployed cloud services 311. A network 313 of FIG. 3 can represent operable connection with the general Internet, one or more local networks, and/or with further cloud deployments.

In some embodiments, the hot pool 301 includes one or more servers (virtual and/or physical) that are active, have active cyber range instances running thereupon, and where users are actively using those cyber range instances.

The warm pool 303 can include one or more servers (virtual and/or physical) that are active and have active cyber range instances running thereupon, but where users are not actively using those cyber range instances. Once one of these cyber range instances becomes marked by the system for active use by a user, the corresponding server(s) can be moved from the warm pool 303 to the hot pool 301.

Then, the cool pool 305 comprises servers (virtual and/or physical) that are inactive, but ready to be spun-up to a status of being active with an active cyber range instance running hereupon. Where one of these cyber range instances becomes marked by the system for active use by a user (e.g., where there is no available warm pool cyber range instance for the user), the corresponding server(s) can be moved from cool pool 305 to hot pool 301 (or in various embodiments first from cool pool 305 to warm pool 303, and then onward to hot pool 301).

Control logic which the system can apply in controlling the functionality of pools 301-305 will now be discussed. When a user connects and wants to start a cyber range, the system can determine whether the warm pool 303 includes a server running an instance of the desired cyber range. Where the system finds such as server, it can mark the relevant cyber range instance for use by the user and can move the corresponding server to the hot pool 301. Where the system finds no such server, it can act as discussed above.

Additionally and/or alternatively, the system can check, for example, against predetermined minimum and maximum values, the number of servers in the warm pool 303 and the cool pool 305. Where the system finds that the number of servers in either of these two pools has fallen below the minimum value, the system can trigger the instantiation of the called-for quantity of servers in the relevant ones of these two pools. If the number of available servers in the warm pool 303 or the cool pool 305 is above the maximum number, the system can perform server deletion and/or move operations. By way of example, where the quantity of servers in cool pool 305 is too high, the system can delete an appropriate quantity of servers from this pool until the number of servers is under the predetermined maximum. As another example, where the quantity of servers in warm pool 303 is too high, the system can perform one or more of: a) deleting an appropriate quantity of servers from warm pool 303; and/or b) moving an appropriate quantity of servers from the warm pool 303 to the cool pool 305.

Figure 4:
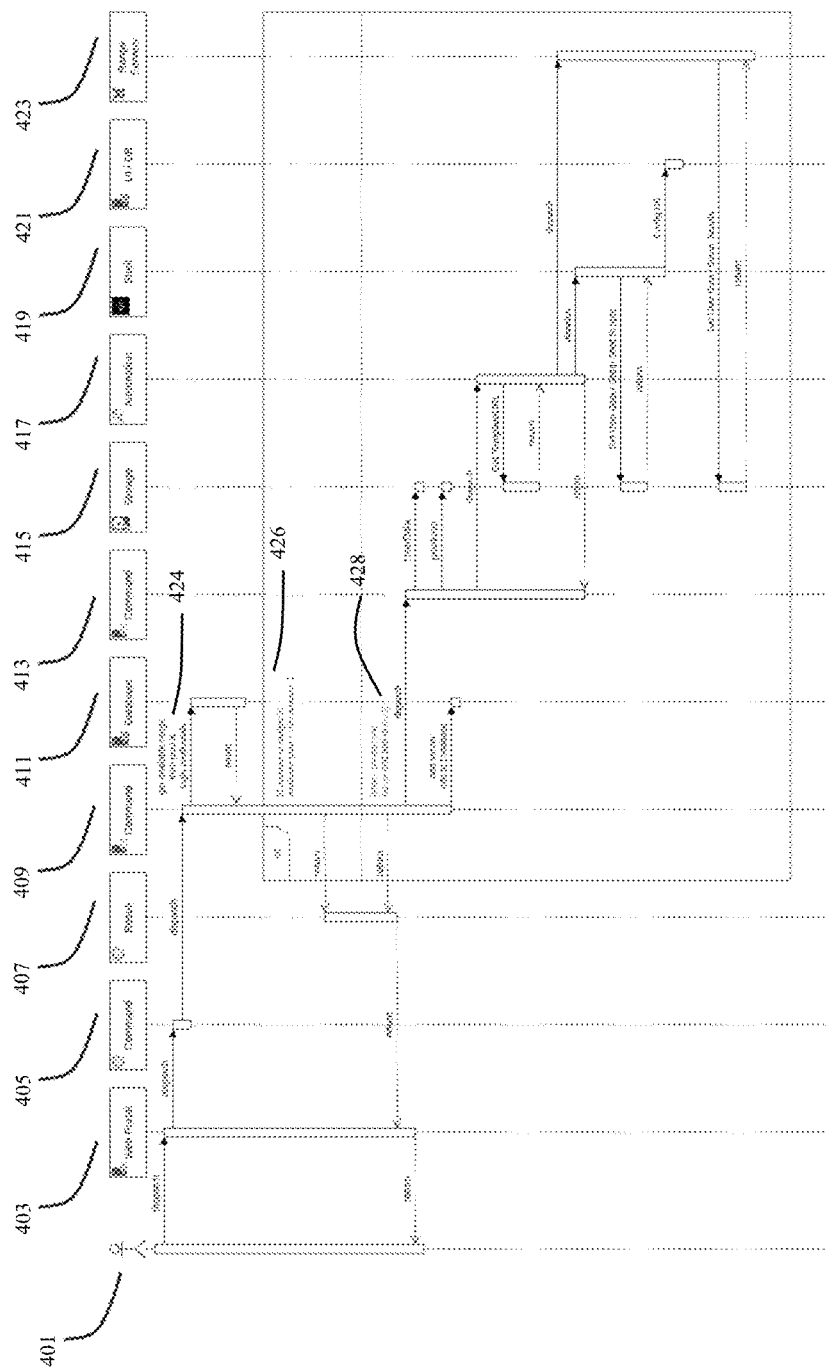
FIG. 4 is a top-level sequence diagram that illustrates exemplary data flow for various operations which occur, and messages/communications which are sent among actors, according to various embodiments.

Turning to FIG. 4, a sequence diagram regarding various operations which occur, and messages/communications which are sent among actors, when a user 401 desirous of utilizing a given cyber range is satisfied by a range server(s) 423 is shown. The actors can include a user 401, a web portal 403, a command 405, a result 407, a command 409, a database 411, a command 413, a storage 415, an automation 417, a shell 419, a UI/database 421, and one or more range server(s) 423. Similar to the operation of the hot pool 301, the warm pool 303, and the cool pool 301, it is noted that among the messages/communications depicted by FIG. 4 is a message/communication 424 that depicts accessing a relevant cyber range instance of a corresponding pool, including the sending of login credentials of user 401. Similarly, among the operations depicted by FIG. 4, operations 426 and 428 illustrate the instantiation of servers for a given pool where the number of servers in that pool has fallen beneath the corresponding threshold.

Social Engineering Game

According to various embodiments, the system can provide a computerized social engineering game to player users. The social engineering game can be implemented as a stand-alone entity or be integrated into a larger or different computerized game, where the outcome of the social engineering game can influence the path of the other computerized game. The social engineering game can serve to train players in thinking along the lines of social engineering scenarios. As will be discussed, a given player can play either the role of an antagonist or a protagonist. An antagonist player can use social engineering skills to deceive protagonist players, and protagonist players can identify the usage of social engineering skills by antagonist players. In this way, the players can become more aware of social engineering tactics if used against them in real life (e.g., in an attempt by criminals to gain disallowed access to information and/or network resources).

Setup of a particular instance of the game can include the system presenting a user interface (UI) which depicts—for instance via graphic images/icons of people—each of the n players who are to participate in the game instance. In various embodiments, the value of n can be at least 5. In other embodiments, the value of n need not be subject to this constraint. The players can include user players who are randomly selected or pre-selected by the system. For example, the system can draw such user players from a pool of users who have indicated to the system (e.g., via the UI) a desire to participate in a game instance. Further, the players can include artificial intelligence (AI)-controlled entities provided by the system, such as non-player characters (NPCs). In various embodiments, such an AI-controlled player can be implemented via one or more machine learning (ML) approaches. As just some examples, such ML approaches can include one or more of reinforcement learning techniques, recurrent neural network layers, neural embeddings (e.g., word embeddings), and/or generative learning techniques. In other embodiments, such an AI-controlled player can be implemented via rule-based approaches and/or via approaches that are not ML-based. Such employ of an AI-controlled player can offer benefits including flexibility in gameplay and training levels.

In some embodiments, players can be defined by one or more roles. For example, the system can randomly and secretly assign each player to either a protagonist role or an antagonist role. In variously assigning protagonist and antagonist roles to the players, the system can adhere to one or more ratios. The system can act such that the quantity of protagonists outnumbers the antagonists. As just some examples, such a protagonist:antagonist ratio can include 1.5:1 (or roughly 1.5:1) or 5:2 (or roughly 5:2). Implementation can be such that the system only informs (e.g., via a UI) antagonist players of the true identities (i.e., in terms of being antagonists or protagonists) of all players in the game, including the other antagonists. As such, this knowledge can be unknown to the protagonists. As discussed hereinbelow, protagonists play the role they represent in the game session. As such, protagonist players honestly convey themselves to be protagonists when interacting with other players. In contrast, players who are antagonists generally intentionally and secretly misrepresent the role they are supposed to play in the game. As such, antagonist players generally dishonestly convey themselves to be protagonists when interacting with protagonist players.

Figure 5:
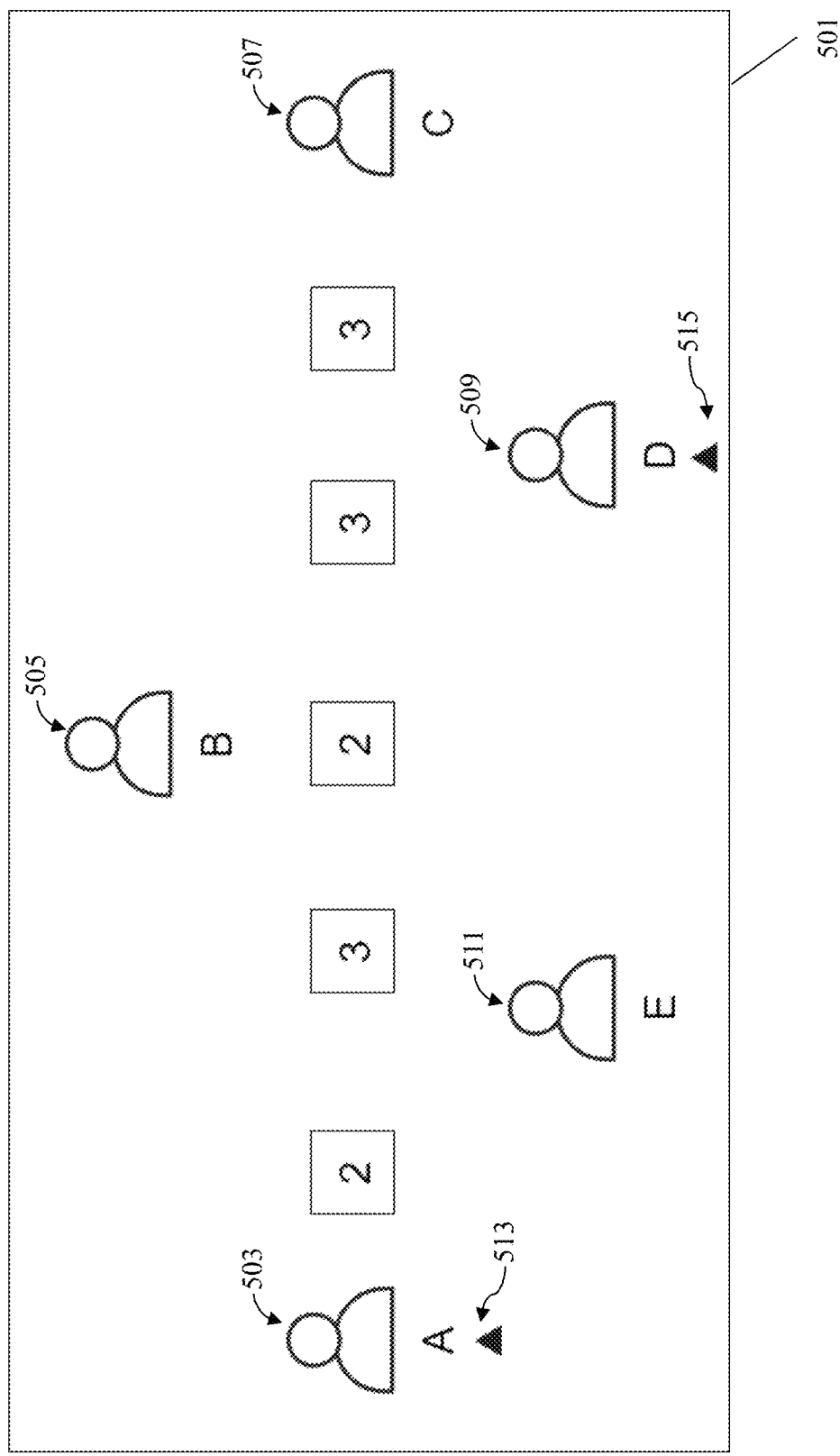
FIG. 5 is an exemplary user interface (UI) that illustrates a display screen for an antagonist player, according to various embodiments.

Turning to FIG. 5, shown is an example UI 501. The UI of FIG. α illustrates the display for an antagonist player. According to the example of FIG. 5, five players A-E are shown. In keeping with this, the system displays, via the UI, graphic images/icons 503-511, each of which corresponds to a given one of the five players A-E, respectively. Next to each of graphic image/icon 503 and 509, the system displays a pointer image/icon (513, 515). In this way, the system indicates that the player A corresponding to graphic image/icon 503 and the player D corresponding to graphic image/icon 509 are antagonists. The system can present the UI of 501 to each of those two players.

After setup, the system can commence gameplay. Here, in one aspect, the system can choose one of the players to be a team leader for the first round. Later, the system can choose a team leader for each of subsequent rounds. The team leader chosen by the system can for a given round be either a protagonist or an antagonist. The system can select the quantity of rounds which are to be played.

As one example, the system can randomly choose a team leader for a given round (e.g., for the first round). As another example, the system can assign numbers to players, and the player whom the system chooses as team leader for a given round can be based on a correlation between the number of the round and the chosen player number (e.g., the system can select player #1 as team leader for the first round, select player #2 as team leader for the second round, and so on). Such number assignment can involve the system randomly assign consecutive numbers to each player at the beginning of the game.

Further, the system can display a UI that shows the quantity of players. This quantity of players can indicate how many players the team leader is to assemble to go on the "mission" of the round (e.g., a first "mission" where the round is the first round). For a given team for a given round, the team leader for that round can be—but does not have to be—one of the team members. Further information regarding a mission is discussed hereinbelow.

The team leader for a given round can propose a certain set of players as the team of the round via a UI. Once the team leader has proposed the set of players for the team, the entire group of players can utilize a UI provided by the system to vote to approve or disapprove of the team. As just one example, a majority vote can be sufficient to approve the proposed team. Where the proposed team is not approved, the system can choose a different user to be team leader. For instance, the system can select as team leader a user having a user number one higher than the user number of the initial team leader, or can randomly select a different user as team leader). In this way, a process of team leader selection, proposal of players for the team, and voting on such proposal can repeat until a team is approved.

The system can provide textual (e.g., text chat, short-messaging-service (SMS), electronic mail (e-mail), and so on), audio (e.g., Voice-Over-IP, Discord, and so on), and/or video communication (e.g., Zoom, WebEx, Google Hangout, Microsoft Teams) venues, which allow players to communicate with one another. As just some examples, players can use these communication venues to communicate with each other either or both of: a) prior to the team leader proposing a team composition; and b) subsequent to the system informing the players of the team composition proposed by the team leader, but prior to voting.

As reflected hereinbelow, it can be advantageous for the protagonist players to have as many protagonists on a team as possible. And, it can be advantageous for the antagonist players to have as many antagonists on a team as possible. For this reason, is can be strategically advantageous for a given player to seek to be included on the team by using the communications system to attempt to convince other player (s) (e.g., including the leader player) of such inclusion. Alternately and/or additionally, a given player can use the communication system to attempt to convince other player (s) (e.g., including the leader player) that certain specified players should and/or should not be included on the team.

In some embodiments, the communications that occur in conjunction with team proposal and voting (i.e., in between each round) represent a game juncture where players can employ social engineering techniques, and/or can attempt to recognize the employ of social engineering techniques by other players. Employable social engineering techniques can include, as just some examples, intimidation, logic, empathy, guilt, and psychological manipulation. As an example, a given player can employ social engineering in "selling" the other players of that given player's role (true or otherwise). The system can impose no rules (or only limited rules intended to ensure game safety) regarding that which comprises an allowable social engineering technique.

As such, as just some examples the antagonist players can, utilizing the communication capabilities provided the system, employ social engineering techniques in attempt to secure as many antagonists on the team as possible. As some further examples, the protagonist players can, utilizing the communication capabilities provided the system, attempt to recognize the employ of social engineering techniques by antagonist players. Protagonists can, for instance, apply observation and/or logic to deduce who the antagonists are to protect themselves. Moreover, antagonists can, for instance, use subterfuge and/or deceit (e.g., to confuse and/or divide the protagonists in their ability to unite effectively and/or to mount a viable defense while staying hidden till the end of the game).

Figure 6:
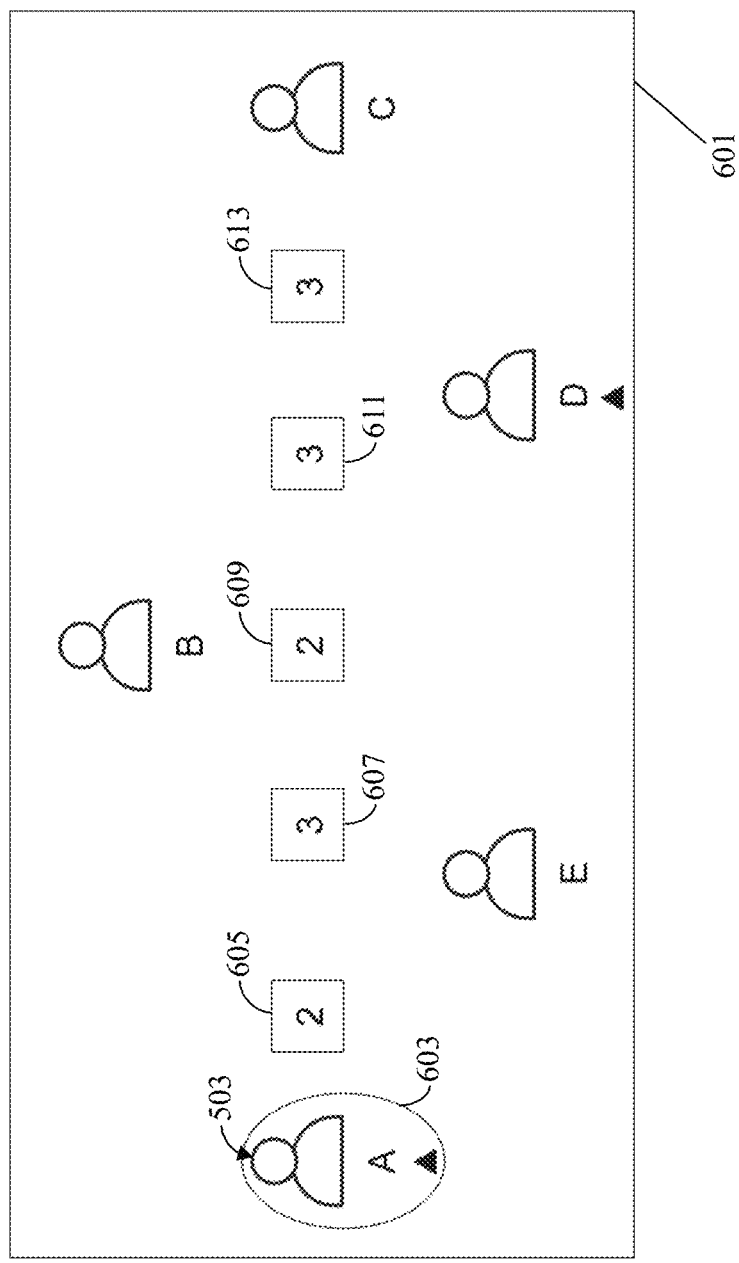
FIG. 6 is an exemplary UI which can be displayed in connection with indicating an identity of a team leader, and the quantities of players who are to comprise the teams of various rounds, according to various embodiments.

Turning to FIG. 6, shown is an example UI 601. The UI 601 indicates the identity of a team leader (i.e., player A), and the number of players who are to comprise the teams of various rounds. According to the example of FIG. 6, the system displays a circle 603 around a graphic image/icon 603. In this way, the system indicates that it has selected the player A corresponding to graphic image/icon 603 as the team leader for the current round. According to the example of FIG. 6, the first round is the current round.

Also in FIG. 6, the number of players who are to comprise the teams of various rounds are displayed via the numbers 605-613. Number 605—depicting a "2"—indicates that for the first/current round, the team leader (i.e., the player corresponding to graphic image/icon 503) is to propose two players for the team. Likewise, number 607, by depicting a "3", indicates that the team leader for the second round is to propose three players. In like fashion, number 609 indicates that two players are to be proposed, number 611 indicates that three players are to be proposed, and number 613 indicates that three players are to be proposed.

Once a proposed team has been approved, the players which make up the team can proceed with the mission. Performance of the mission can involve the players voting in secret (e.g., via UI provided by the system) for the mission to be a success or a failure. As just one example, a mission can be considered successful by the system where all votes are for success, and be otherwise considered a failure (e.g., a single vote for failure can cause the system to consider the mission a failure).

In the context of the game, scoring can be such that the mission being a success scores a point for the protagonists, while the mission being a failure scores a point for the antagonists. In line with this, as noted, it can be advantageous for the protagonist players to have as many protagonists on a team as possible, and it can be advantageous for the antagonist players to have as many antagonists on a team as possible. In various embodiments, the system can cast (e.g., via UI) such mission success/failure in the context of a storyline, such as an infosec storyline. As an illustration, such an infosec storyline might specify that a vote for mission failure can comprise an organization experiencing an infosec security breach (e.g., an exploitation of a port vulnerability, a username discovery, or a theft of user credentials). Such storyline aspects (e.g., that which a vote for mission failure represents) and be customizable (e.g., via a UI provided by the system), thereby allowing for customized scenarios.

As the mission being a success scores a point for the protagonists, a protagonist player can be expected to vote for mission success. In some embodiments, the system can limit voting for mission success (e.g., via a UI) to protagonists only. As the mission being a failure scores a point for the antagonists, an antagonist player can often be expected to vote for mission failure. However, an antagonist can also opt to vote for mission success, such as part of a time-extended social engineering/deception strategy (e.g., attempting, by way of voting for mission success, to convince the protagonist players that he/she is a protagonist, the antagonist hoping that doing so will accrue larger long-term rewards). The system can, in various embodiments, allow for communications between players before the vote. At least in these ways, the vote for mission success/failure represents a further game juncture where players can employ social engineering techniques, and/or can attempt to recognize the employ of social engineering techniques by other players. Once all the votes from the team members have been secretly submitted, the results of the voting can be revealed by the system (e.g., via a UI).

Figure 7:
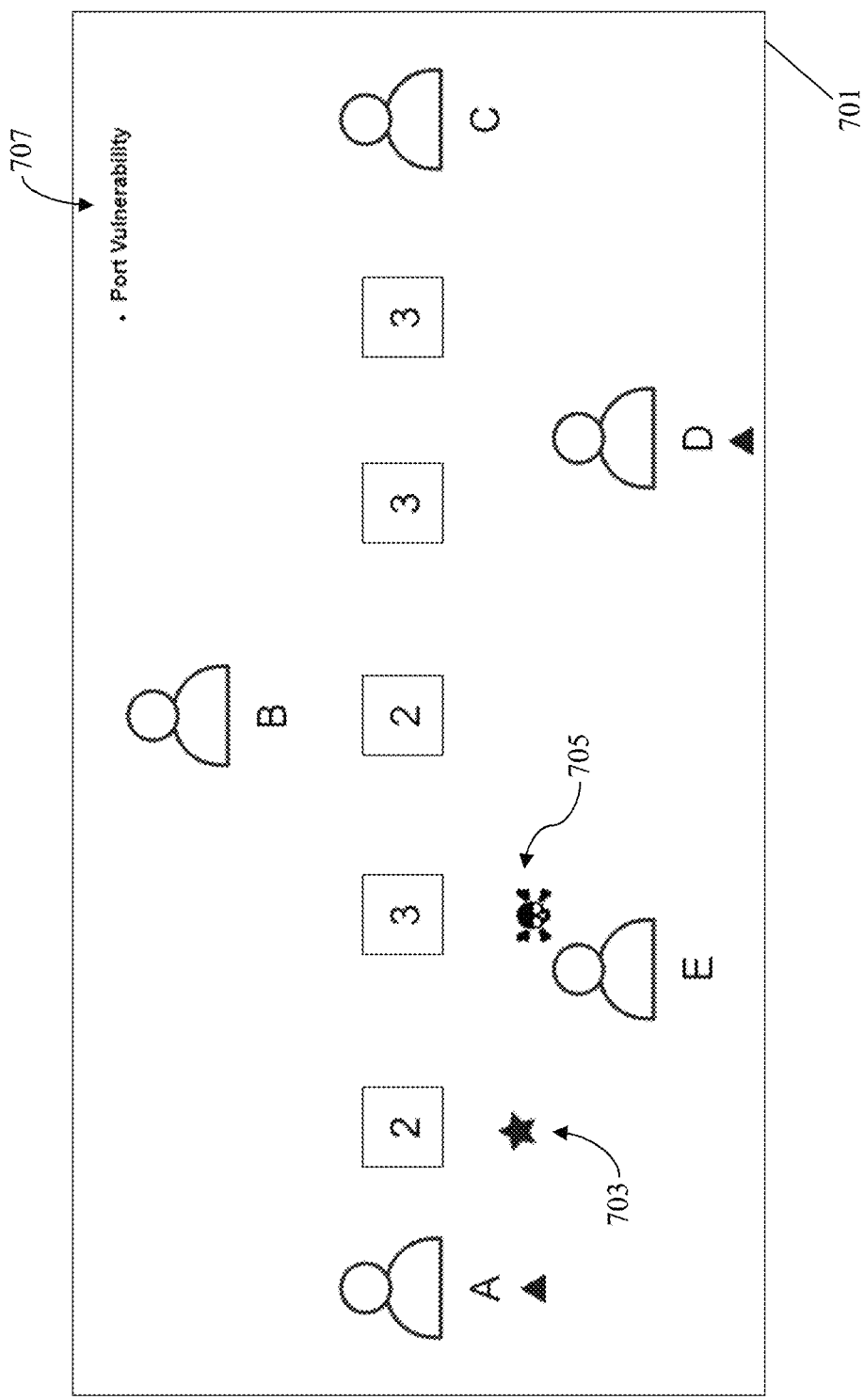
FIG. 7 is an exemplary UI which can be displayed once gameplay is underway, according to various embodiments.

Turning to FIG. 7, an example UI 701 is shown, which the system can display once gameplay is underway. According to the example UI 701, the system presents a star graphic image/icon 703, indicating that round 1 resulted in a point for the protagonists. According to the example, this represents that all the team members—be they or antagonists (in secret hiding) or protagonists—voted for the mission of that round to be a success. Further, the system presents a skull graphic image/icon 705, indicating that round 2 resulted in a point for the antagonists. According to the example, this represents that at least one of the team members—an antagonist—secretly voted for the mission of that round to be a failure. Also in FIG. 7, the system presents a text element 707. With this text element 707, the system indicates that the mission failure of round 2 corresponds to an exploitation of a port vulnerability, according to a storyline of the game.

The game can continue in the discussed fashion until all the rounds have been played. The group—protagonists or antagonists—who have accrued the most victory point at the end of the game can win the game. The system can declare, via a UI, whether it is the protagonists or the antagonists who have won. As just some examples, winning the overall game can be represented in rank within game rosters, and/or by fictional currency or virtual currency (e.g., bitcoin). Such fictional or virtual currency can, for instance, be usable in the game to buy upgraded game features such as fancier icons.

Figure 8:
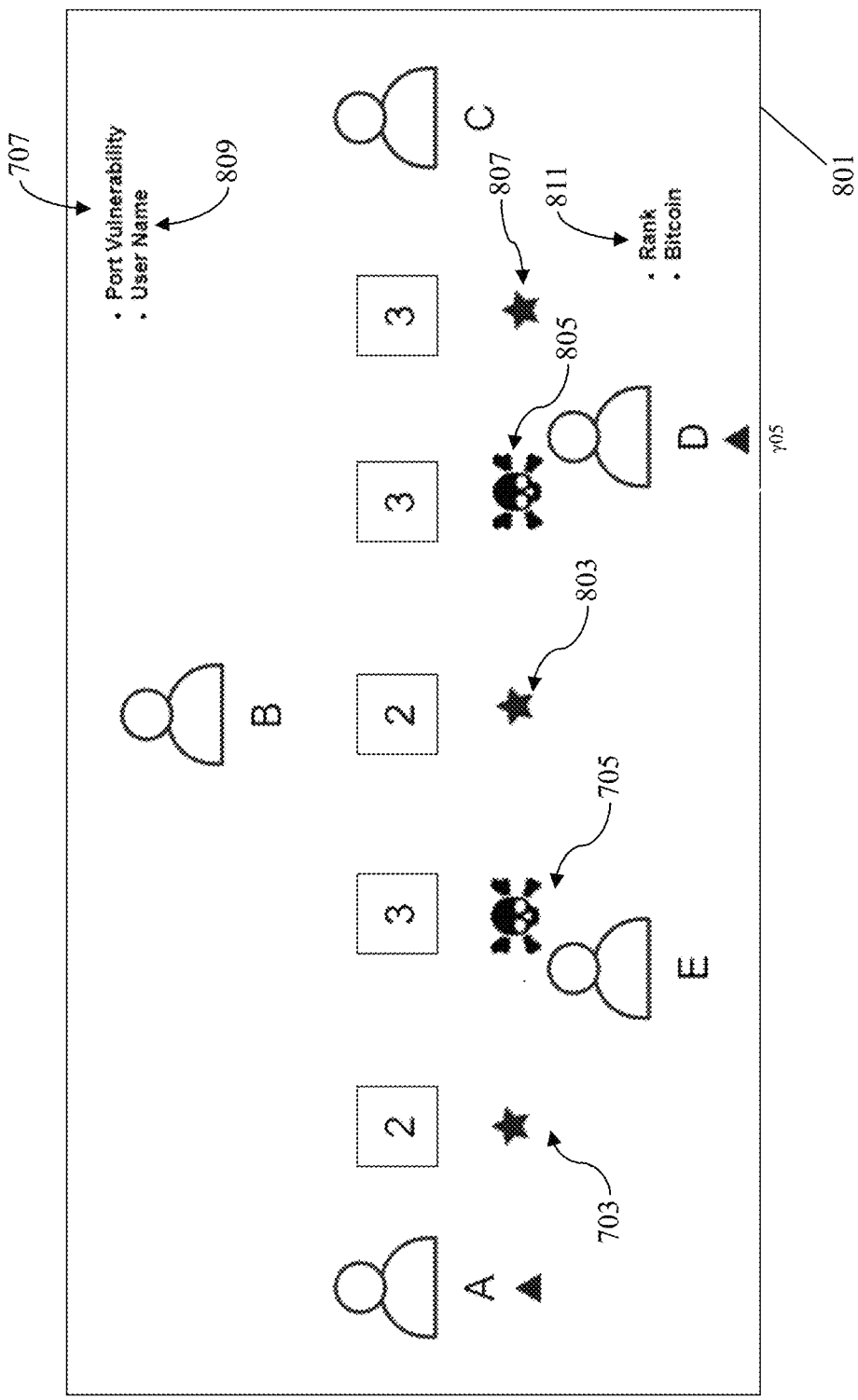
FIG. 8 is an exemplary UI which can be displayed once the game has ended, according to various embodiments.

Turning to FIG. 8, shown is an example UI 801 which the system can display once the game has ended. Here, further to FIG. 7, presented are star graphic images/icons 803 and 807 showing that rounds 3 and 5 resulted in points for the protagonists, and skull graphic image/icon 805 showing that round 4 resulted in a point for the antagonists. Also further to FIG. 7, text element 809 indicates that the mission failure of round 4 corresponds to a username discovery, according to the storyline of the game. According to the example of FIG. 8, it is the protagonists who have won the game, as they have earned three points (via rounds 1, 3, and 5), while the antagonists have only earned two points (via rounds 2 and 4). Then, via element 809, the system indicates via the UI that winning protagonists have experienced a rise in rank and have earned bitcoin.

In this way, the social engineering game can provide an experience which is focused on strategy, verbal cues, and deduction. The social engineering game functionality can provide an effective and accessible way for people to learn and practice social engineering skills, so that they may become more aware of these tactics if used against them in real life. The social engineering game can simulate creativity and "on the fly" deduction and reaction that can be transferred and applied to both a real world, and virtual world scenario outside of the game.

Vulcan Range-Building Tool

In some embodiments, the range building SDK module 117 can also provide a graphical user interface that enables users and developers to build their own cyber ranges, for example, in the cloud. The graphical UI can further provide a drag and drop interface. The user can select from the objects that will be used in the range from the drag and drop interface. The objects are dragged from the selection box on the left side of the screen and dropped onto the network diagram on the right side of the screen. Network connections between objects are created by selecting one object and dragging a line to another object. Right clicking the network connection allows the specification of the type of network protocol (i.e., IP, IPv6, NetBios, etc.).

Right-clicking an object after it is dropped into the range allows the selection from a drop down menu of vulnerabilities and flags unique to that object. By way of example, objects that can be dragged and dropped into a cyber range include, but are not limited to, routers, servers, printers, network switches, firewalls, databases, storage units, and so on. These objects can represent physical and/or virtual objects as desired.

Figure 9:
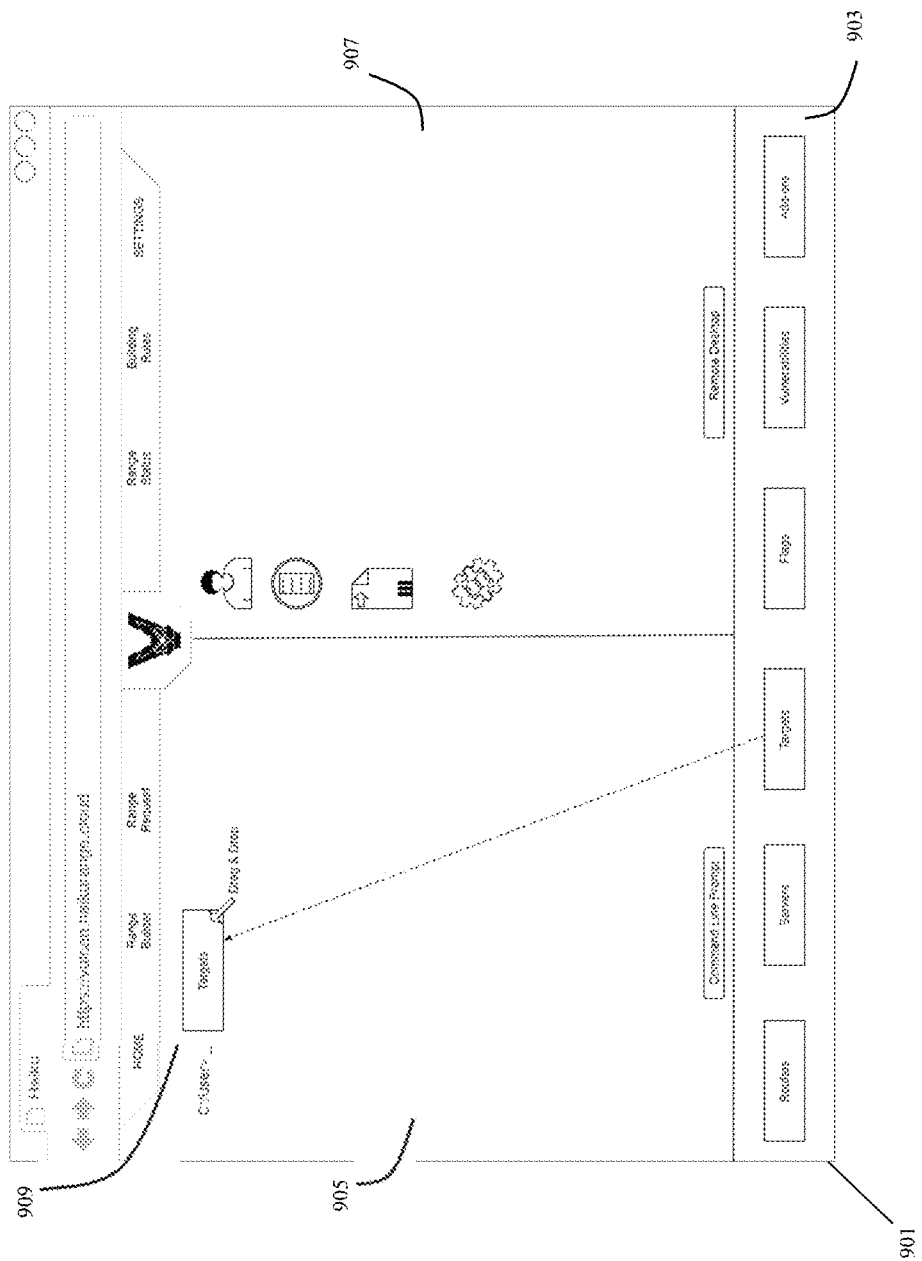
FIG. 9 is an exemplary UI which depicts drag and drop functionality for building/editing cyber ranges, according to various embodiments.

Turning to FIG. 9, depicted is a graphical UI 901 for building/editing cyber ranges. According to the example of FIG. 9, the user can utilize drag and drop functionality to resolve/configure new or existing elements of a cyber range. Depicted in FIG. 9 are cyber range elements 903, including "routers," "servers." "targets," "flags," "vulnerabilities," and "add-ons."

Here, the user has elected to resolve/configure a cyber range target. By dragging the cyber range target to command line prompt 905, the user can resolve/configure the chosen target in a command line prompt fashion. For example, after dragging the chosen target to command line prompt 905, various editable command line text can appear. By dragging the cyber range target to desktop 907, the user can receive from the UI one or more UI elements (e.g., dialog boxes) which allow the user to resolve/configure the chosen target. As depicted, according to the example of FIG. 9 the user has chosen to resolve/configure via command line prompt 905.

Figure 10:
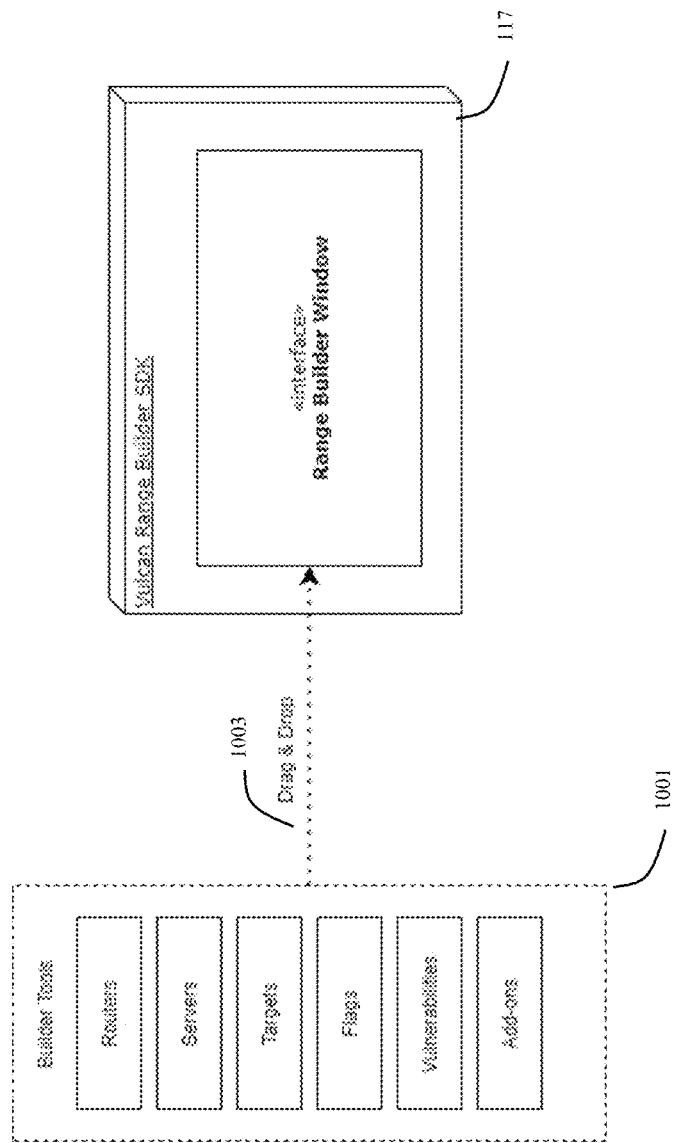
FIG. 10 is a diagram depicting interprocess communication which occurs when drag and drop functionality is utilized, according to various embodiments.

With reference to FIG. 10, depicted is inter-process communication which occurs when a user utilizes the discussed drag and drop functionality in building/editing a cyber range. In particular, the user can perform drag and drop with respect to one or more of the cyber range elements provided by builder tools 1001. In response, inter-process communication 1003 (e.g., one or more method calls) can provide range building SDK module 117 with information about the user action (e.g., indication of a particular cyber range element selected by the user, and the location to which the user has dropped the element).

Figure 11:
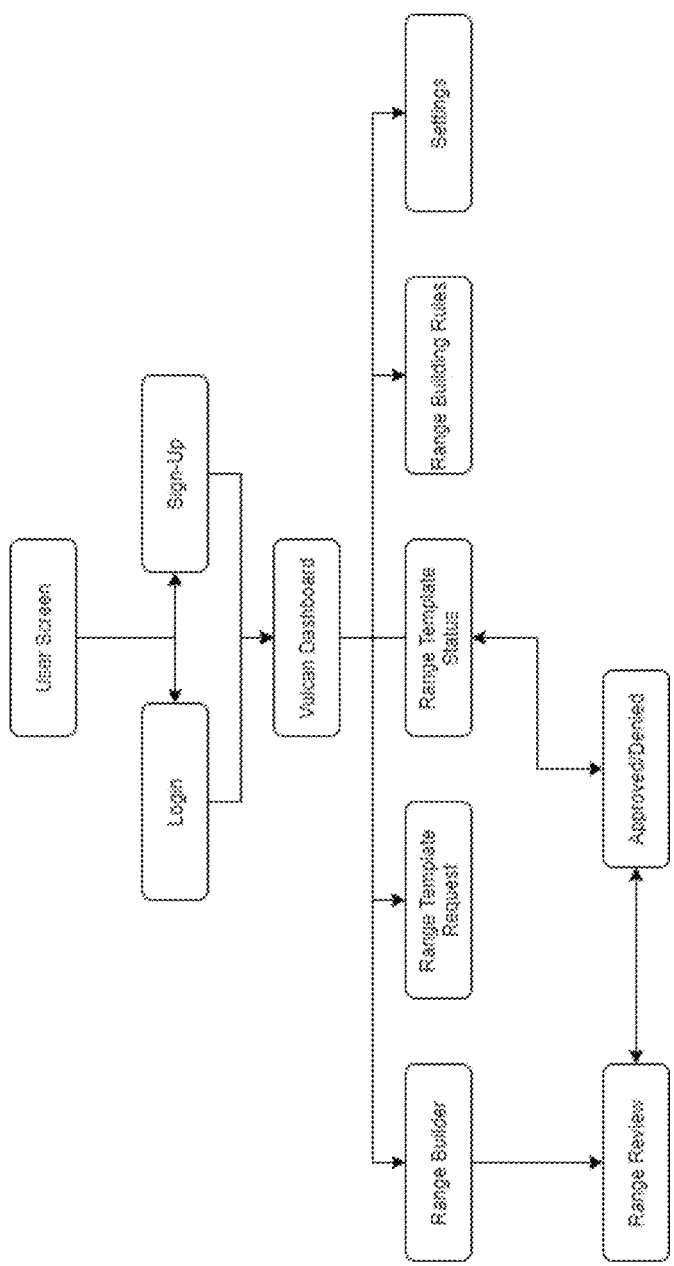
FIG. 11 is a flowchart showing another exemplary data flow for interaction with the system by a user, according to various embodiments.

With reference to FIG. 11, the user has the ability to select from prebuilt range templates that can be modified, as well as the ability to create a new range from scratch.

The range building SDK module 117 advantageously allows range developers (from novice to expert users) to collaborate with and contribute to any number of cyber ranges for other users to exploit. These cyber ranges not only test one's skills in white hat hacking but also challenge those to build exploits for others to crack.

Figure 12:
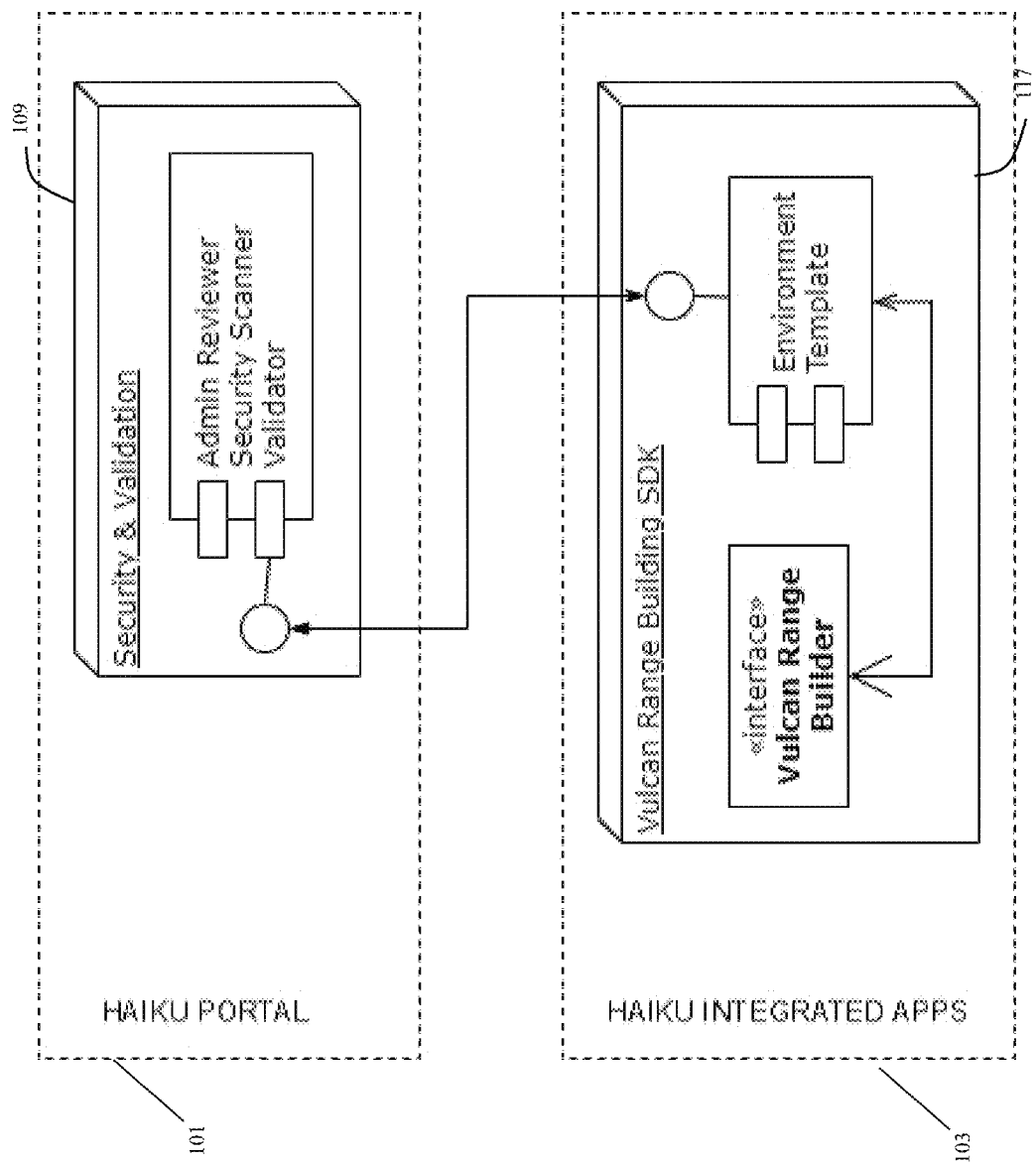
FIG. 12 is a top-level system diagram that illustrates an exemplary general architecture view of the system of FIG. 1, according to various embodiments.

As previously discussed, the security and validation module 109 can provide administrator capabilities to review, scanning, and validate. With reference to FIG. 12, the security and validation module 109 cooperates with the range building SDK module 117 to validate submitted environmental templates from the range building SDK module 117, thereby reassuring security. Specifically, the security and validation module 109 sets a pre-approved process for administrators of the system to give (e.g., via a UI provided by the system) final sign-off of templates submitted by third-party (or other) range builder developers.

Hardware and Software

According to various embodiments, various functionality discussed herein can be performed by and/or with the help of one or more computers. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 13:
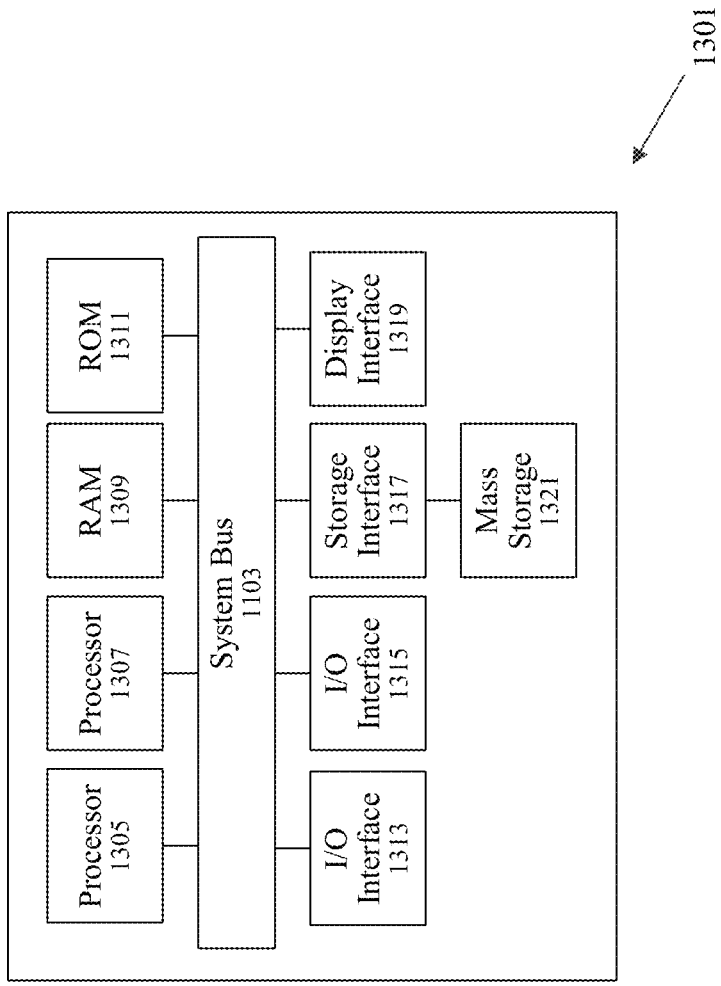
FIG. 13 shows an exemplary computer system that can be used with various embodiments.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 13 is an example computer employable in various embodiments of the present invention. Exemplary computer 1301 includes system bus 1303 which operatively connects two processors 1305 and 1307, random access memory (RAM) 1309, read-only memory (ROM) 1311, input output (I/O) interfaces 1313 and 1315, storage interface 1317, and display interface 1319. Storage interface 1317 in turn connects to mass storage 1321. Each of I/O interfaces 1313 and 1315 can, as just some examples, be a Universal Serial Bus (USB), a Thunderbolt, an Ethernet, a Bluetooth, a Long Term Evolution (LTE), an IEEE 488 and/or other interface. Mass storage 1321 can be a flash drive, a hard drive, an optical drive, or a memory chip, as just some possibilities. Processors 1305 and 1307 can each be, as just some examples, a commonly known processor such as an ARM-based or x86-based processor. Computer 1301 can, in various embodiments, include or be connected to a touch screen, a mouse, and/or a keyboard. Computer 1301 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using Python, Java, Swift, C, C++, C #, and/or another language. Corresponding program code might be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module might instead be performed by a plurality of software modules. Similarly, any operations indicated as being performed by a plurality of modules might instead be performed by a single module. It is noted that operations indicated as being performed by a particular computer might instead be performed by a plurality of computers. It is further noted that, in various embodiments, peer-to-peer and/or grid computing techniques may be employed. It is additionally noted that, in various embodiments, remote communication among software modules may occur. Such remote communication might, for example, involve JavaScript Object Notation-Remote Procedure Call (JSON-RPC), Simple Object Access Protocol (SOAP), Java Messaging Service (JMS), Remote Method Invocation (RMI), Remote Procedure Call (RPC), sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

RAMIFICATIONS AND SCOPE

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

The invention claimed is:

1. A system for network-based cyber training, comprising:
a control tower;
a scoring engine in operable communication with the control tower;
a security and validation engine for providing administrative control over the control tower; and
a cloud formation engine for allocating one or more servers to the control tower,
wherein the control tower can generate one or more cyber ranges through the security and validation engine by providing a graphical user interface, the graphical user interface providing one or more drag and drop objects and a network diagram representing a blank cyber range template, and
wherein the cloud formation engine allocates the one or more servers to the cyber ranges based on a hot pool, a warm pool, and a cool pool,
the hot pool includes servers that are active, have active cyber range instances running thereupon, and the cyber range instances being actively used,
the warm pool includes servers that are active and have active cyber range instances running thereupon, the cyber range instances not being used, and
the cool pool comprises servers that are inactive, but ready to be spun-up to a status of being active with an active cyber range instance running hereupon.

2. The system of claim 1, wherein the control tower provides the graphical user interface through a software development kit.

3. The system of claim 1, wherein the one or more drag and drop objects comprises at least one of a router, a server, a printer, a network switch, a firewall, a database, and a storage units.

4. A computer-implemented method for network-based cyber training, comprising:
allocating one or more servers via a cloud formation engine to a control tower;
providing a graphical user interface to enable administrative control over the control tower via a security and validation engine, the graphical user interface providing one or more drag and drop objects and a network diagram representing a blank cyber range template;

receiving input from the provided graphical user interface; and generating one or more cyber ranges through the security and validation engine via the control tower based on the received input from the provided graphical user interface;

wherein said allocating comprises assigning the one or more servers to the cyber ranges based on a hot pool, a warm pool, and a cool pool via the cloud formation engine, the hot pool includes servers that are active, have active cyber range instances running thereupon, and the cyber range instances being actively used, the warm pool includes servers that are active and have active cyber range instances running thereupon, the cyber range instances not being used, and the cool pool comprises servers that are inactive, but ready to be spun-up to a status of being active with an active cyber range instance running hereupon.

5. The computer-implemented method of claim 4, wherein said providing the graphical user interface comprises providing the graphical user interface through a software development kit.

6. The computer-implemented method of claim 4, wherein the one or more drag and drop objects comprises at least one of a router, a server, a printer, a network switch, a firewall, a database, and a storage units.

7. A non-transitory computer-readable storage medium for network-based cyber training, wherein the non-transitory computer-readable storage medium includes instructions that, when executed by at least one processor of a computing system, cause the computing system to perform a method comprising:

allocating one or more servers via a cloud formation engine to a control tower;

providing a graphical user interface to enable administrative control over the control tower via a security and validation engine, the graphical user interface providing one or more drag and drop objects and a network diagram representing a blank cyber range template;

receiving input from the provided graphical user interface; and generating one or more cyber ranges through the security and validation engine via the control tower based on the received input from the provided graphical user interface;

wherein said allocating comprises assigning the one or more servers to the cyber ranges based on a hot pool, a warm pool, and a cool pool via the cloud formation engine, the hot pool includes servers that are active, have active cyber range instances running thereupon, and the cyber range instances being actively used, the warm pool includes servers that are active and have active cyber range instances running thereupon, the cyber range instances not being used, and the cool pool comprises servers that are inactive, but ready to be spun-up to a status of being active with an active cyber range instance running hereupon.

8. The non-transitory computer-readable storage medium of claim 7, wherein said providing the graphical user interface comprises providing the graphical user interface through a software development kit.

9. The non-transitory computer-readable storage medium of claim 7, wherein the one or more drag and drop objects comprises at least one of a router, a server, a printer, a network switch, a firewall, a database, and a storage units.

* * * * *